(12) United States Patent
Dockter et al.

(10) Patent No.: US 6,910,661 B2
(45) Date of Patent: Jun. 28, 2005

(54) GEOMETRIC MORPHING WING

(75) Inventors: Gregory E. Dockter, Mesa, AZ (US); Brian K. Hamilton, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 4 days.

(21) Appl. No.: 10/268,574

(22) Filed: Oct. 10, 2002

(65) Prior Publication Data

US 2004/0069907 A1 Apr. 15, 2004

(51) Int. Cl.[7] ................................................. B64C 3/44
(52) U.S. Cl. ........................ 244/218; 244/219; 244/201; 244/123
(58) Field of Search ................................ 244/218, 219, 244/201, 203, 46, 123

(56) References Cited

U.S. PATENT DOCUMENTS

| | | | | |
|---|---|---|---|---|
| 2,979,287 A | * | 4/1961 | Ross ........................... | 244/219 |
| 3,893,639 A | * | 7/1975 | Croswell, Jr. ................ | 244/219 |
| 3,957,232 A | * | 5/1976 | Sebrell ........................ | 244/123 |
| 4,824,053 A | * | 4/1989 | Sarh ............................ | 244/218 |
| 6,015,115 A | * | 1/2000 | Dorsett et al. .............. | 244/123 |
| 6,199,796 B1 | * | 3/2001 | Reinhard et al. ......... | 244/35 R |
| 6,347,769 B1 | * | 2/2002 | To et al. ..................... | 244/219 |

FOREIGN PATENT DOCUMENTS

FR      2568216 A1 * 1/1986      B64C/3/30

* cited by examiner

*Primary Examiner*—Michael J. Carone
*Assistant Examiner*—Gabriel S. Sukman
(74) *Attorney, Agent, or Firm*—Artz & Artz, P.C.

(57) ABSTRACT

An airfoil member (14) is provided including a geometric morphing device (18). The geometric morphing device (18) has an inflatable member (30). The inflatable member (30) has an exterior wall (32) and multiple inflated states. A fiber mesh (34) is coupled to at least a portion of the exterior wall (32) and changes in shape according to fiber angle. Shape and size of the geometric morphing device (18) are adjustable by changing inflated state of the inflatable member (30). An airfoil member altering system (12) and a method of performing the same are also provided as well as a method of forming the geometric morphing device (18).

29 Claims, 3 Drawing Sheets

GEOMETRIC MORPHING WING

RELATED APPLICATION

The present invention is related to U.S. patent application Ser. No. 10/218,996 entitled "Geometric Morphing Wing with Expandable Spars" and U.S. patent application Ser. No. 10/268,558 entitled "Geometric Morphing Wing with Layers", which are incorporated by reference herein.

TECHNICAL FIELD

The present invention relates generally to aeronautical vehicle systems, and more particularly, to an apparatus, system, and method of altering the size and shape of an airfoil member.

BACKGROUND OF THE INVENTION

Airfoil members such as wings, horizontal and vertical stabilizers, conards, rotor blades, etc. are limited in ability to change their sizes and shapes so as to alter surfaces of the airfoil member and be adaptable to multiple flight conditions of a flight envelope.

Currently, airfoil member surfaces of an aircraft can be modified to a certain extent by various devices for improved flight characteristics such as during low-speed handling, autopilot maneuvering, or for high-speed aerodynamics. Aircraft that need to operate in several performance environments, however, often must compromise flight performance by using airfoil members that provide suitable characteristics in multiple environments rather than using airfoil members that are specifically designed for a particular flight situation.

Aircraft designs known today utilize a variety of airfoil member surface modifying devices such as, flaps, slats, flaperons, ailerons, split ailerons, or other leading or trailing edge devices known in the art, to provide control forces and moments during flight. Also, other devices such as micro flow devices, zero mass jets, and the like are used to control the airflow over the airfoil member to further control forces and moments. Additionally, devices such as smart materials are used to slightly modify shape of the airfoil member itself or of the airfoil member surface modifying devices. However, all of there devices are limited in their ability to alter shape, size, and characteristics of the airfoil member; the airfoil member devices typically only modify a single aspect of the airfoil member, minimally affect airflow, or slightly modify shape of the airfoil member. Furthermore, all of the above-stated devices tend to use mechanical actuators and other mechanical components to perform minor changes in an airfoil surface.

Military aircraft have utilized mechanically swept wings for improved aerodynamics during high-speed flight. These mechanical surface systems, however, typically only provide a very limited ability to affect airfoil member shape and aerodynamic flight characteristics of the aircraft. The limited ability to significantly change airfoil member shape can result in an airfoil member that is particularly suitable for only a limited range of a flight envelope.

It is therefore desirable to provide an airfoil member and an airfoil member altering system that significantly modifies shape and size of the airfoil member and at the same time provides an airfoil member with increased adaptability for various flight conditions throughout a flight envelope. An airfoil member with improved adaptability may potentially be capable of supporting greater payloads at lower speeds and during take-off, better lift characteristics at high speed, and increased flight range.

SUMMARY OF THE INVENTION

The present invention provides an apparatus, system, and method of altering the size and shape of an airfoil member. The airfoil member includes a geometric morphing device, which has an inflatable member. The inflatable member has an exterior wall and multiple inflated states. A fiber mesh is coupled to at least a portion of the exterior wall and changes in shape according to fiber angle. Shape and size of t he geometric morphing device are adjustable by changing the inflated state of the inflatable member. An airfoil member altering system and a method of performing the same are also provided, as well as a method of forming the geometric morphing device.

The present invention has several advantages over existing airfoil member altering devices. One advantage is that the invention provides an airfoil member that is capable of significantly changing its size and shape. Versatility of the present invention also allows shape of the airfoil member to alter in compound manners. The ability to significantly change in size and shape provides increase application versatility and increased flight control throughout a flight envelope.

Another advantage of the present invention is that it provides improved adaptability. The present invention provides improved flight characteristics including supporting greater payloads at lower speeds and during take-off, better lift at higher speeds, and increased flight range in comparison with traditional airfoil member altering devices that are limited in one or more of the above-stated characteristics.

The present invention itself, together with further objects and attendant advantages, will be best understood by reference to the following detailed description, taken in conjunction with the accompanying drawing.

DETAILED DESCRIPTION OF THE PREFERRED EMBODIMENT

Figure 1:
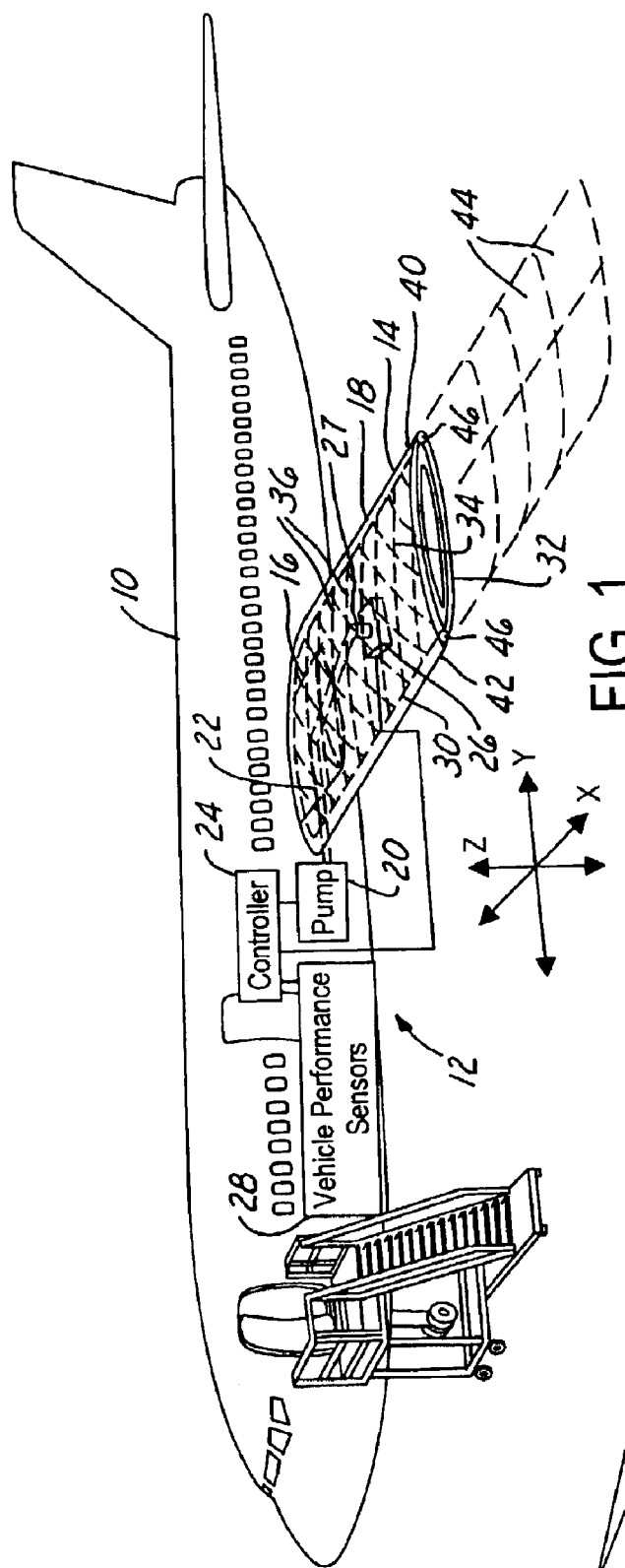
FIG. 1 is a perspective and schematic view of an aircraft that is utilizing an airfoil member altering system in accordance with an embodiment of the present invention.

In each of the following figures, the same reference numerals are used to refer to the same components. While the present invention is described with respect to an apparatus, system, and method of altering size and shape of an airfoil member, the present invention may be adapted for various applications including ground-based vehicles, aeronautical vehicles including fixed wing and rotary wing aircraft, watercraft, and other applications known in the art that require the use of airfoil members. The present invention may be applied to vertical stabilizers to increase control at lower speeds and to decrease drag at higher speeds, to winglets for modifying flight speed, and as well as to horizontal and conard surfaces. The present invention may be applied to flaps and ailerons to modify shape of an airfoil member. The present invention may also be used to modify flight control by changing the size and shape of a first wing in a first manner and by maintaining a second wing in a current state or by changing the size and shape of the second wing in a second manner, thus causing rolling, pitching, or yawing moments.

In the following description, various operating parameters and components are described for one constructed embodiment. These specific parameters and components are included as examples and are not meant to be limiting.

Also, in the following description the term "morphing" refers to ability of an object or device to change. The term "geometric morphing device" refers to the ability of a device to change in size and shape. For example, an airfoil member of the present invention is capable of changing in size and shape such that span, chord, and camber of the airfoil member are adjustable.

Referring now to FIG. 1, a perspective and schematic view of an aircraft 10 that is utilizing an airfoil member altering system 12 in accordance with an embodiment of the present invention is shown. The airfoil system 12 includes an airfoil member 14 having a rigid member 16 and a geometric morphing device 18 that is adjustable in both size and shape. The morphing device 18 is fluidically coupled to a pump 20, via tubes 22, which transfer fluid between the tubes 22 and the morphing device 18. A controller 24 is electrically coupled to the pump 20, to a solenoid 26, and to an inflatable member pressure sensor 27. The controller 24 is also electrically coupled to multiple aircraft devices including vehicle performance sensors 28 and aircraft control inceptors (not shown). The controller 24 may be coupled to other aircraft devices and may determine positions of the control inceptors for constant vehicle operating states such as a constant altitude mode or constant velocity mode. The controller 28 determines appropriate size and shape of the morphing device 18 for multiple flight conditions throughout a flight envelope. Of course, mechanical devices may also be used to modify the geometric morphing device 18.

Although in FIG. 1, for simplicity, a single geometric morphing device 18 is shown for a single airfoil member 14 and although a single inflatable member 30 is shown for the morphing device 18, the present invention may have multiple airfoil members each of which having multiple morphing devices, and may have multiple inflatable members per morphing device.

The morphing device 18 includes an inflatable member 30, which may overlap the rigid member 16. Although, a single rigid member is shown multiple rigid members may be utilized and may exist within the inflatable member 30. The inflatable member 30 may inflate in a unilateral direction or in multiple directions. The inflatable member 30 has an exterior wall 32 and multiple inflated states. A fiber mesh 34, having multiple fibers 36, is coupled to the exterior wall 32 and changes in shape according to angles of the fibers 36, hereinafter referred to as fiber angle. The morphing device 18 is adjustable in size and shape by changing inflated state of the inflatable member 30, according to fiber angle. The shape and size of the morphing device 18 is not limited to changing in a single direction and may change in compound directions, which will become more apparent with the following description.

The inflatable member 18 is pressurized by fluid, which may be in the form of atmospheric air, hydrogen, or other lightweight liquid or gaseous fluid, or combination thereof. The inflatable member 18 may have multiple chambers as to minimize effects of punctures or leaks in the member 18. The inflatable member 18 may be used to dampen or absorb air turbulence.

Figure 3:
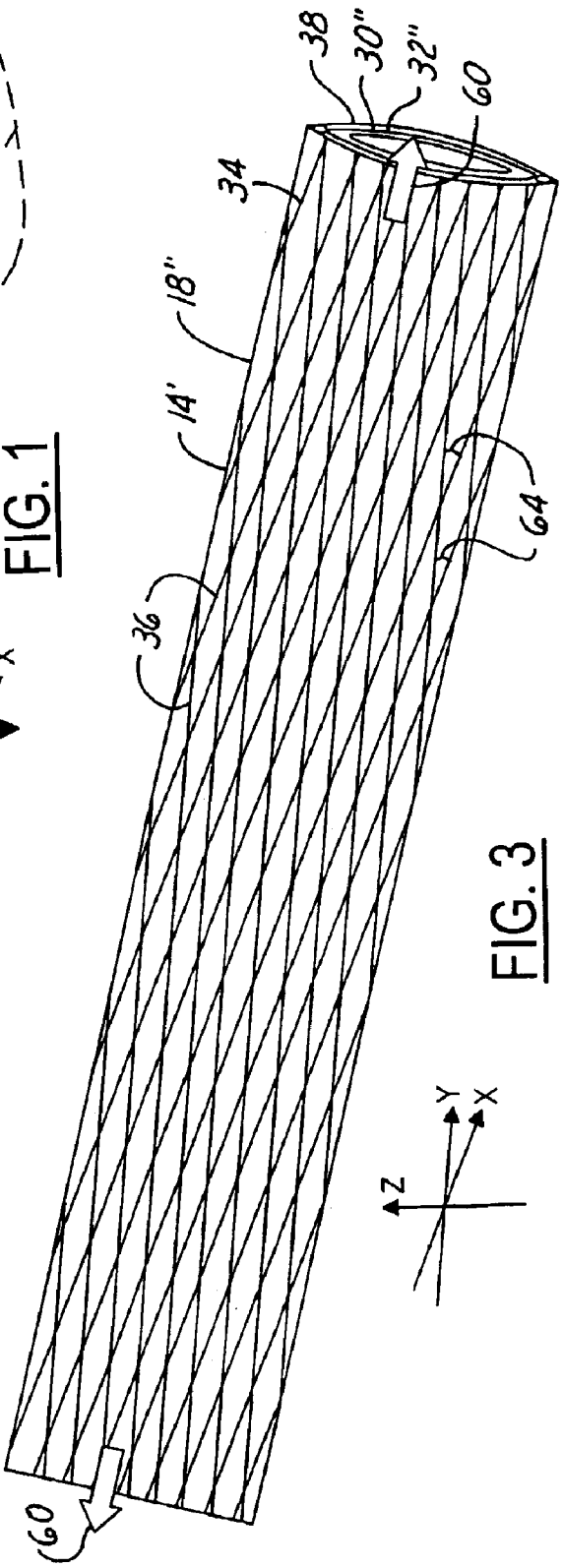
FIG. 3 is a perspective view of an airfoil member having a geometric morphing device stretched significantly along a span axis in accordance with another embodiment of the present invention.
Figure 2:
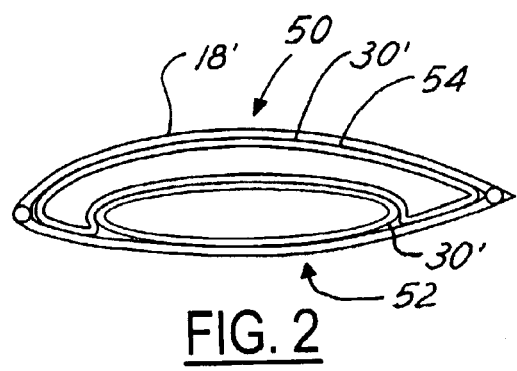
FIG. 2 is a cross-sectional side view of a geometric morphing device having multiple inflatable members in accordance with an embodiment of the present invention.

The fiber mesh 34 is a braided/overlay of the multiple fibers 36 that provides rigidity to the morphing device 18. The fiber mesh 34 may be formed of steel fibers, composite fibers such as kevlar or zylon, aluminum fibers, or other fibers known in the art with high tensile strength. The fiber mesh 34 may also have varying tensile strength across the morphing device 18. The fiber mesh 34 may be coupled within the exterior wall 32, as shown, or may be part of a geometric morphing support layer 38 that encapsulates an exterior wall 32", as best seen in FIGS. 2 and 3.

The exterior wall 32 and the support layer 38 are continuously in tension to maintain appropriate shape and rigidity of the airfoil member 14 for various flight conditions. The exterior wall 32 is formed of elastomeric material or a combination of elastomeric material and a fiber material as in fiber mesh 34. The support layer 38 is formed of elastomeric and fiber material as in fiber mesh 34. The fiber mesh 34 may be embedded within the exterior wall 32 or may be embedded within the support layer 38.

The fiber mesh 34 may have a uniform, patterned, diverse, or varying fiber angle distribution. Maximum width of the morphing device is dependent upon density distribution of the fibers 36. Also, the density of the fibers 36 or the number of fibers 36 per square inch area of the morphing device 18 may be diverse. For example, the number of fibers 36 may be greater near a trailing edge 40 of the airfoil member 14 and less near a leading edge 42 of the airfoil member 14 such that the inflatable member 30 expands more near the leading edge 42 than near the trailing edge 40. The density of the fibers 36 per square inch area may vary in order to provide varying degrees of rigidity and expansion for different portions of the morphing device 18. The morphing device 18 may have multiple drop-off areas whereby the number of fibers 36 per square inch in a particular direction decreases. In combination, for example, the fiber mesh 34 may have multiple stations 44 having varying numbers of fibers per square inch and varying angles between fibers for a specific inflated state.

The morphing device 18 has a pair of supporting spars 46 and may also include expandable spars and ribs. Although, the supporting spars 46 are located near the trailing edge 40 and the leading edge 42 they may be located elsewhere. For further explanation on expandable spars, see U.S. patent application Ser. No. 10/218,996 entitled "Geometric Morphing Wing with Expandable Spars". Ribs may be used to retain shape of the morphing device when the inflatable member 30 is deflated. Any number of spars or ribs may be used.

The controller 24 is preferably microprocessor based such as a computer having a central processing unit, memory (RAM and/or ROM), and associated input and output buses. The controller 24 may be a portion of a central main control unit, a flight controller, or may be a stand-alone controller as shown.

The vehicle performance sensors 28 may include vehicle external air pressure sensors, velocity sensors, acceleration sensors, moment sensors, altitude sensors, inflatable member pressure sensors, or other sensors known in the art. The vehicle performance sensors 28 may determine a current velocity and acceleration of the aircraft 10, as well as determining a current moment about a heading or z-axis, a pitch or x-axis, and a roll or y-axis.

Referring now to FIG. 2, a cross-sectional side view of a geometric morphing device 18' having multiple inflatable members 30' in accordance with an embodiment of the present invention is shown. Distribution and quantity of inflatable members 30', fiber angle distribution, and fiber density separately or in combination may also be varied throughout the morphing device 18' so as to allow for change in camber of the morphing device 18'. In one embodiment of the present invention, an upper portion 50 of the morphing device 18' is altered differently than a lower portion 52 of the morphing device 18', by applying an increased amount of pressure in an upper inflatable member 54, thus adjusting camber. Note an airfoil member that has ability to be altered in camber may be utilized on an aircraft that transitions quickly from low traveling speeds to high traveling speeds.

Figure 4:
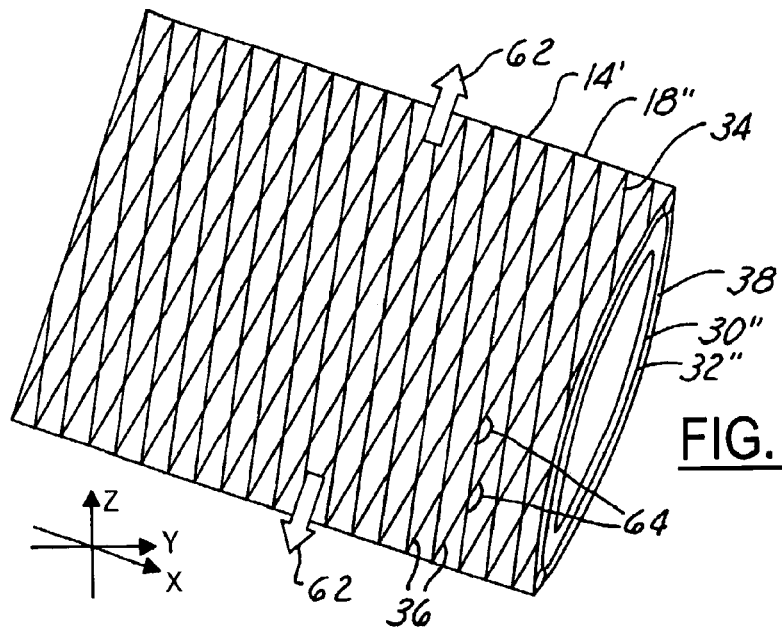
FIG. 4 is a perspective view of an airfoil member having a geometric morphing device stretched significantly along a chord axis in accordance with another embodiment of the present invention.

Referring now to FIGS. 3 and 4, perspective views of an airfoil member 14' having a geometric morphing device 18" stretched significantly along a span axis, as represented by arrows 60, and significantly along a chord axis, as represented by 62 is shown.

The morphing device 18" has multiple span, chord, and camber combinational modes corresponding to multiple flight conditions. The morphing device 18" has approximately a 200% difference in span length between a minimum span state to a maximum span state and also has approximately a 200% difference in chord length between a minimum chord state and a maximum chord state. The fiber angles 64 of the fiber mesh 34 may vary between approximately 0° in a first fully stretched state, corresponding to a maximum span length of said morphing device, and approximately 180° in a second fully stretched state, corresponding to a maximum chord length of said morphing device 18".

In FIG. 3, the morphing device 18" is shown such that the fiber mesh 34 is stretched significantly along the span axis and the fibers 36 are at an angle of approximately 10° relative to the x-axis. In FIG. 4, the morphing device 18" is shown such that the fiber mesh 34 is stretched significantly along the chord axis and the fibers 36 are at an angle of approximately 80° relative to the x-axis.

Although the fibers 36 are shown having a uniform distribution across the morphing device 18" and having a uniform number of fibers 36 per square inch the fibers 36 as stated above may have varying distributions and distribution densities.

Figure 5:
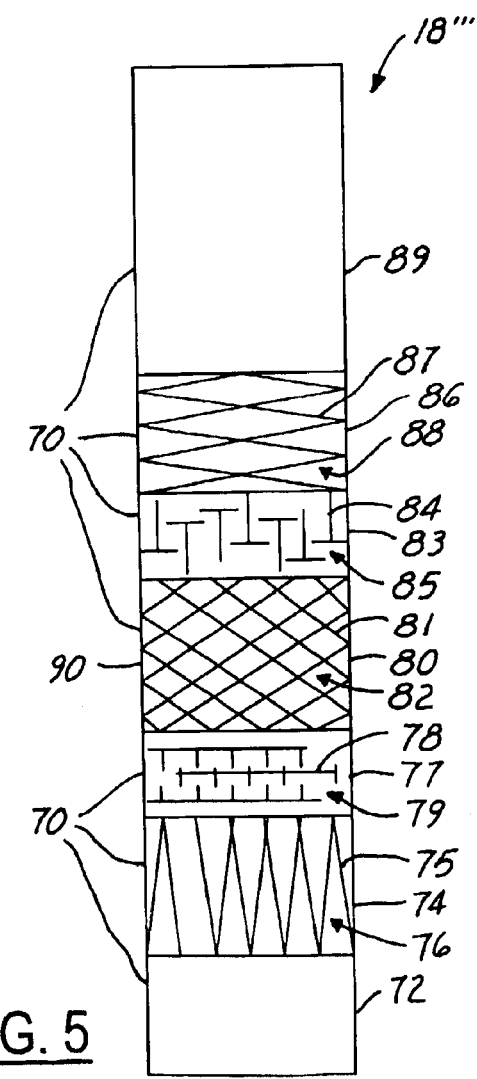
FIG. 5 is a quarter cross-sectional view of a geometric morphing device including multiple layers in accordance with another embodiment of the present invention.

Referring now to FIG. 5, a sample quarter cross-sectional view of a geometric morphing device 18''' including multiple layers 70 in accordance with another embodiment of the present invention is shown. The geometric morphing device 18''', as shown, includes an inner elastomer layer 72, which may in itself be an inflatable member. A first fiber layer 74 having a first fiber mesh 75 with a first fiber pattern 76 is coupled to the inner elastomer layer 72. A first elastomer with fiber layer 77 having a second fiber mesh 78 and a second fiber pattern 79 is coupled to the first fiber layer 74. A second fiber layer 80 having a third fiber mesh 81 and a third fiber pattern 82 is coupled to the first elastomer with fiber layer 77. A second elastomer with fiber layer 83 having a fourth fiber mesh 84 with a forth fiber pattern 85 is coupled to the second fiber layer 80. A third fiber layer 86 having a fifth fiber mesh 87 and a fifth fiber pattern 88 is coupled to the second elastomer with fiber layer 83. An outer elastomer layer 89 is coupled to the third fiber layer 86 and provides a smooth outer shell. The above stated layers form a matrix 90. Of course, there may be any number of elastomer layers, fiber layers, and elastomer with fiber layers. Also, each layer 70 may be of various size and shape and be of various material as stated herein and as known in the art.

The fiber layers 74, 80, and 86 may have varying fiber meshes with varying fiber angles between fibers. The fiber angles of the fiber layers 74, 80, and 86 control shaping of the geometric morphing device 18'''. Each fiber mesh of the fiber layers 74, 80, and 86 may have uniform, identical, varying, or multiple fiber patterns or a combination thereof.

The elastomer with fiber layers 77 and 83 have fiber meshes 78 and 84 that may be embedded within elastomer material of the layers 77 and 83, as shown. The fiber meshes 75, 78, 81, 84 and 87 provide stiffness to maintain shape of the layers 74, 77, 80, 83, and 86 and of the geometric morphing device 18'''.

Having multiple layers with varying fiber matrices, fiber patterns, and layer distributions increase versatility in controlling size, shape, and expansion ability of the geometric morphing device 18'.

Figure 6:
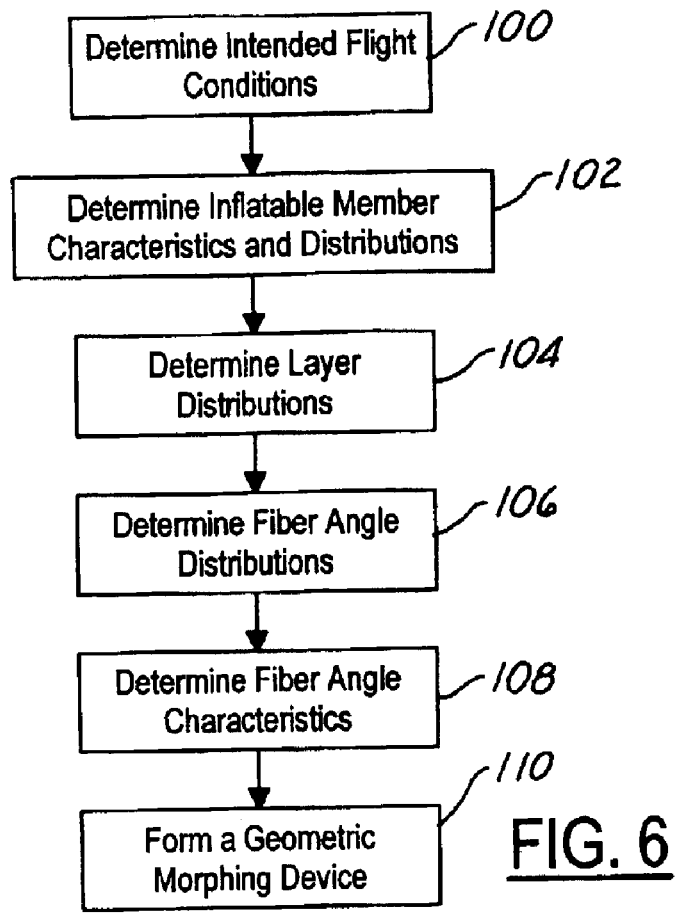
FIG. 6 is a logic flow diagram illustrating a method of forming a geometric morphing device in accordance with an embodiment of the present invention.

Referring now to FIG. 6, a logic flow diagram illustrating a method of forming a geometric morphing device in accordance with an embodiment of the present invention is shown.

In step 100, intended flight conditions for a flight envelope of an aircraft of interest are determined. Generally, an aircraft has intended use and a corresponding flight envelope. The present invention may be applied in development of an aircraft for a specific flight envelope but fortunately, due to the versatility of the present invention, may also be designed to operate in multiple flight envelopes or to operate in ranges outside of the intended use flight envelope.

In step 102, inflatable member distributions and characteristics are determined including quantity, material type, size, shape, and other inflatable member characteristics known in the art.

In step 104, when the geometric morphing device is to have multiple layers, layer distributions are determined for the layers. The layer distributions may include number of layers, types of layers, distribution of the layers or in other words where each layer is coupled relative to each and every other layer, and other layer distributions known in the art.

In step 106, fiber angle distributions are determined along a chord axis or a span axis including determining minimum and maximum angles for various flight conditions. Fibers may be preset to have varying fiber angles for a particular inflated state.

In step 108, fiber characteristics are determined including fiber density, fiber material, fiber thickness, and fiber distribution to satisfy flight envelopes of interest such that a morphing device may be altered into multiple shapes, each shape corresponding to a particular flight condition. Fiber taper or drop-off is also determined for multiple stations.

When the geometric morphing device 18 has multiple layers 70, steps 106 and 108 are performed for each layer 70. Fiber angle distributions and fiber characteristics may be determined relative to each other and as a conglomerate so as to perform a desired result.

In step 110, a geometric morphing device is formed according to above determined design specifications in steps 100–108.

Figure 7:
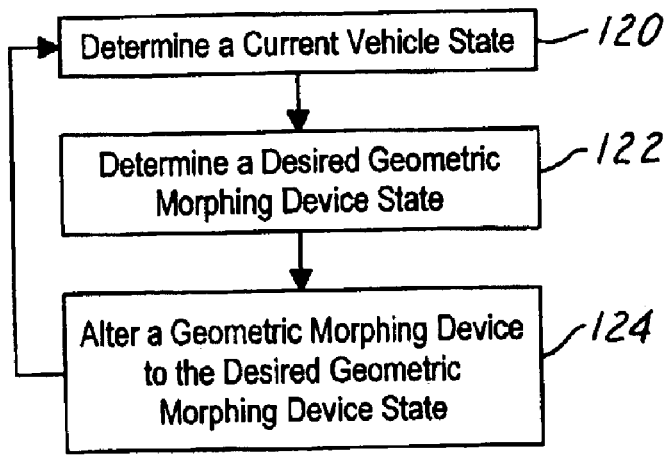
FIG. 7 is a logic flow diagram illustrating a method of altering an airfoil member in accordance with an embodiment of the present invention.

Referring now to FIG. 7, a logic flow diagram illustrating a method of altering the airfoil member 14 in accordance with an embodiment of the present invention is shown.

In step 120, a current vehicle state is determined including generation of vehicle performance signals. A vehicle operator command signal may also be generated including inceptor positioning. The controller 28 determines a current vehicle state and a desired vehicle state in response to said vehicle performance signals and said operator command signals.

In step 122, the controller 28 in response to the current vehicle state, the desired vehicle state, and the vehicle performance signals determines a desired state of the morphing device 30.

In step 124, the controller 28 compares a current state of the morphing device 30 with desired state of the morphing device 30 and alters size and shape of the morphing device 30, accordingly, to allow the aircraft 10 to transition to the desired vehicle state. The controller 28 may calculate fiber angles along a chord axis or a span axis to determine the desired inflated state of the inflatable member 30, by using a look-up table relating inflated states to particular flight conditions, or by other methods known in the art. As inflated state is adjusted, by adjusting pressure within the inflatable member 30, fiber angles within the fiber mesh 34 are altered to adjust size, shape, span, chord, camber or a combination thereof. Resulting inflated stated provides proper torsion on components of the aircraft 10 for a current flight condition.

In one embodiment of the present invention, the controller 28 may determine internal pressure of the inflatable member 30 in response to airspeed, descent speed, and climb speed.

The controller 28 in determining pressures for the inflatable member 30 may also determine the pressures in response to takeoff weight, angle of attack, stall characteristics, or other aeronautical vehicle parameters known in the art.

In another embodiment of the present invention in order to increase chord length of the morphing device 18 the controller 28 transitions from a first inflated state to a second inflated state. The first state having a first chord length, a first span length, and a corresponding first pressured state. Pressure is adjusted in an inflatable member of the morphing device 18 to a second pressured state to alter the morphing device to have a second chord length that is greater than the first chord length and a second span length that is less than a first span length.

The above-described steps in the above methods are meant to be an illustrative example, the steps may be performed synchronously, continuously, or in a different order depending upon the application.

The present invention may be applied in a rotary aircraft, whereby a forward moving rotary blade has a different shape than a retreating rotary blade, for improved lift distribution. The present invention may also be used to minimize rotor noise during dynamic operation.

The present invention may also be applied to a conard rotor wing aircraft to reverse an airfoil and increase or decrease span of a conard rotor to improve performance during a vertical lift mode or hover mode and during a fixed wing mode or cruise mode.

The present invention provides an airfoil member that is capable of being significantly altered in size and shape to provide increase performance throughout one or more flight envelopes. The present invention is capable of improving performance of an aircraft at multiple flight speeds including at lower speeds by changing stall speed and lift of an airfoil member and at higher speeds by reducing drag while maintaining optimal lift.

The above-described apparatus and method, to one skilled in the art, is capable of being adapted for various applications and systems known in the art. The above-described invention can also be varied without deviating from the true scope of the invention.

What is claimed is:

1. An airfoil member comprising:
  at least one geometric morphing device comprising:
   at least one non-fiber mesh inflatable member having at least one exterior wall and a plurality of inflated states; and
   a fiber mesh that is coupled and external to at least a portion of said at least one exterior wall and changes in shape according to fiber angle;
  said at least one geometric morphing device is adjustable in size and shape by changing inflated state of said at least one non-fiber mesh inflatable member.

2. An airfoil member as in claim 1 further comprising at least one rigid member coupled to said geometric morphing device.

3. An airfoil member as in claim 1 further comprising a geometric morphing support layer encapsulating at least a portion of said at least one exterior wall.

4. An airfoil member as in claim 3 where in said geometric morphing support layer is continuously in tension.

5. An airfoil member as in claim 3 wherein said geometric morphing support layer is formed of elastomeric and fiber material.

6. An airfoil member as in claim 1 wherein said at least one exterior wall is formed of elastomeric material.

7. An airfoil member as in claim 1 wherein each member of said at least one non-fiber mesh inflatable member inflates in a unilateral direction.

8. An airfoil member as in claim 1 wherein said fiber mesh comprises a plurality of fibers, said plurality of fibers having a fiber angle distribution selected from at least one of uniform, patterned, diverse, and varied.

9. An airfoil member as in claim 1 wherein amount of fibers per square inch of said fiber mesh is diverse for at least a portion of said fiber mesh.

10. An airfoil member as in claim 1 wherein angles between fibers of said fiber mesh is diverse for at least a portion of said fiber mesh.

11. An airfoil member altering system for an airfoil member comprising:
  at least one geometric morphing device comprising:
   at least one inflatable member having at least one exterior wall and a plurality of inflated states; and
   a fiber mesh that is coupled to at least a portion of said at least one exterior wall and changes in shape according to fiber angle;
  said at least one geometric morphing device is adjustable in size and shape by changing inflated state of said at least one inflatable member;
  at least one vehicle performance characteristic sensor generating vehicle performance signals;
  a pump fluidically coupled to said at least one inflatable member; and
  a controller electrically coupled to said at least one vehicle performance sensor and said pump and altering size and shape of said at least one geometric morphing device in response to said vehicle performance signals.

12. A system as in claim 11 further comprising pressure sensors coupled to said at least one inflatable member and generating pressure signals, said controller altering size and shape of said at least one geometric morphing device in response to said pressure signals.

13. A system as in claim 11 wherein said controller adjusts pressure in said at least one inflatable member via at least one inflatable member solenoid.

14. A system as in claim 11 wherein said controller increases pressure within said at least one inflatable member to increase a geometric morphing device characteristic selected from at least one of span, chord, and camber for at least a portion of said at least one geometric morphing device.

15. A method of forming a geometric morphing device for an aircraft comprising:
   determining flight conditions for the aircraft;
   determining inflatable members distributions and characteristics in response to said flight conditions;
   determining fiber angle distributions and characteristics in response to said flight conditions; and
   forming the geometric morphing device in response to said inflatable members distributions and characteristics, said fiber angle distributions, and said fiber characteristics.

16. A method of altering an airfoil member comprising:
   determining a current vehicle state; and
   altering size and shape of at least one geometric morphing device in response to said current vehicle state comprising;
      changing inflated state of at least one non-fiber mesh inflatable member; and
      changing size and shape of said at least one geometric morphing device according to fiber angle of a first fiber mesh that is coupled and external to at least a portion of said at least one non-fiber mesh inflatable member.

17. A method as in claim 16 wherein altering size and shape of at least one geometric morphing device comprises:
   changing inflated state of said at least one non-fiber mesh inflatable member; and
   changing shape of an exterior wall of said at least one non-fiber mesh inflatable member according to fiber angle of a second fiber mesh.

18. A method as in claim 16 wherein altering size and shape of at least one geometric morphing device comprises increasing pressure within said at least one non-fiber mesh inflatable member to increase a geometric morphing device characteristic selected from at least one of span, chord, and camber for at least a portion of said at least one geometric morphing device.

19. An airfoil member comprising:
   at least one geometric morphing device comprising:
      a plurality of inflatable members having at least one exterior wall formed of elastomeric and fiber material and a plurality of inflated states;
      geometric morphing support layer encapsulating at least a portion of said at least one exterior wall and having a fiber mesh that is coupled and external to at least a portion of said at least one exterior wall and changes in shape according to fiber angle;
      said at least one geometric morphing device is adjustable in size and shape by changing inflated state of said plurality of inflatable members.

20. An airfoil member as in claim 19 further comprising at least one rigid member coupled to said geometric morphing device.

21. An airfoil member as in claim 19 wherein said geometric morphing support layer is continuously in tension.

22. An airfoil member as in claim 19 wherein said geometric morphing support layer is formed at least partially of elastomeric.

23. An airfoil member as in claim 19 wherein each member of said plurality of inflatable members inflates in a unilateral direction.

24. An airfoil member as in claim 19 wherein said fiber mesh comprises a plurality of fibers, said plurality of fibers having a fiber angle distribution selected from at least one of uniform, patterned, diverse, and varied.

25. An airfoil member as in claim 19 wherein amount of fibers per square inch of said fiber mesh is diverse for at least a portion of said fiber mesh.

26. An airfoil member as in claim 19 wherein angles between fibers of said fiber mesh is diverse for at least a portion of said fiber mesh.

27. A method of altering an airfoil member comprising:
   determining a current vehicle state; and
   altering size and shape of at least one geometric morphing device in response to said current vehicle state comprising;
      changing inflated state of a plurality of inflatable members;
      changing size and shape of at least one support layer having a first fiber mesh and containing said plurality of inflatable members; and
      changing size and shape of said at least one geometric morphing device according to fiber angle of said first fiber mesh that is coupled and external to at least a portion of said plurality of inflatable members.

28. A method as in claim 27 wherein altering size and shape of at least one geometric morphing device comprises:
   changing inflated state of said plurality of inflatable members; and
   changing shape of an exterior wall of said plurality of inflatable members according to fiber angle of a second fiber mesh.

29. A method as in claim 27 wherein altering size and shape of at least one geometric morphing device comprises increasing pressure within said plurality of inflatable members to increase a geometric morphing device characteristic selected from at least one of span, chord, and camber for at least a portion of said at least one geometric morphing device.

* * * * *